US012738668B2

(12) United States Patent
Yamada et al.

(10) Patent No.: US 12,738,668 B2
(45) Date of Patent: Sep. 15, 2026

(54) ANTENNA MODULE AND COMMUNICATION DEVICE EQUIPPED WITH THE SAME

(71) Applicant: Murata Manufacturing Co., Ltd., Nagaokakyo (JP)

(72) Inventors: Yoshiki Yamada, Nagaokakyo (JP); Yuri Yamakawa, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 212 days.

(21) Appl. No.: 18/641,564

(22) Filed: Apr. 22, 2024

(65) Prior Publication Data

US 2024/0313426 A1 Sep. 19, 2024

Related U.S. Application Data

(63) Continuation of application No. PCT/JP2022/041332, filed on Nov. 7, 2022.

(30) Foreign Application Priority Data

Nov. 19, 2021 (JP) ................................ 2021-188799

(51) Int. Cl.
*H01Q 21/22* (2006.01)
*H01Q 1/24* (2006.01)
*H01Q 1/38* (2006.01)

(52) U.S. Cl.
CPC ............... *H01Q 21/22* (2013.01); *H01Q 1/24* (2013.01); *H01Q 1/38* (2013.01)

(58) Field of Classification Search
CPC ............. H01Q 21/22; H01Q 1/24; H01Q 1/38
See application file for complete search history.

(56) References Cited

U.S. PATENT DOCUMENTS 7,271,769 B2 * 9/2007 Asano ...................... H01Q 9/42 343/702
2007/0279298 A1 * 12/2007 Leeng .................... H01Q 21/24 343/702

(Continued)

FOREIGN PATENT DOCUMENTS

EP 3700009 A1 8/2020
JP H04-123603 A 4/1992

(Continued)

OTHER PUBLICATIONS

International Search Report and Written Opinion mailed on Jan. 24, 2023, received for International Application No. PCT/JP2022/041332, filed on Nov. 7, 2022, 8 pages including English Translation.

*Primary Examiner* — Hai V Tran
(74) *Attorney, Agent, or Firm* — XSENSUS LLP

(57) ABSTRACT

An antenna module includes substrates with different normal directions from each other, a radiating element disposed on the substrate, a radiating element disposed on the substrate, a hybrid coupler, and an RFIC. The hybrid coupler includes input terminals (IN1, IN2), and output terminals (OUT1, OUT2). The RFIC is connected to the input terminals (IN1, IN2) and supplies a radio-frequency signal to the radiating elements. The radiating elements are capable of radiating a radio wave in a first frequency band. The radiating element is connected to the output terminal (OUT1), and the radiating element is connected to the output terminal (OUT2). A phase difference between radio-frequency signals to be supplied to the input terminals (IN1, IN2) is adjusted to fall within a range of greater than −90° and less than 90°.

20 Claims, 7 Drawing Sheets

(56) References Cited

U.S. PATENT DOCUMENTS

| | | | | |
|---|---|---|---|---|
| 2016/0013563 | A1* | 1/2016 | Timofeev | H01Q 21/22<br>343/853 |
| 2016/0365646 | A1* | 12/2016 | Higaki | H01Q 9/0457 |
| 2020/0163204 | A1* | 5/2020 | Kim | H01Q 1/44 |
| 2022/0061160 | A1* | 2/2022 | Wang | H05K 1/0216 |
| 2022/0291395 | A1* | 9/2022 | Iyengar | H01Q 9/42 |

FOREIGN PATENT DOCUMENTS

| | | | |
|---|---|---|---|
| JP | 2021-061496 | A | 4/2021 |
| WO | 2020/170722 | A1 | 8/2020 |

* cited by examiner

ANTENNA MODULE AND COMMUNICATION DEVICE EQUIPPED WITH THE SAME

CROSS-REFERENCE TO RELATED APPLICATIONS

The present application is a continuation of PCT application PCT/JP2022/041332, filed Nov. 7, 2022, which claims priority to Japanese application JP 2021-188799, filed Nov. 19, 2021, the entire contents of each of which being incorporated herein by reference.

TECHNICAL FIELD

The present disclosure relates to an antenna module and a communication device equipped with the same and, more specifically, to a technique for extending a radiation range in the antenna module in which radio waves can be radiated in two directions.

BACKGROUND ART

International Publication No. 2020/170722 (Patent Document 1) discloses an antenna module including radiating elements disposed on, of a flat-shaped dielectric substrate bent substantially in an L-shape, two surfaces with different normal directions. In the antenna module disclosed in International Publication No. 2020/170722 (Patent Document 1), a radio wave can be radiated from a radiating element on each surface of the dielectric substrate in a different direction.

CITATION LIST

Patent Document

Patent Document 1: International Publication No. 2020/170722

SUMMARY

Technical Problems

In recent years, mobile terminals, such as smartphones, have come into widespread use. Furthermore, technological innovation, such as IoT, increases use of household electrical appliances or electronic equipment with a wireless communication function. For this reason, communication traffic over a wireless network increases, and there is concern about decreases in communication speed and communication quality.

As a measure to overcome such an issue, the development of the fifth generation mobile communication system (5G) has been advanced. In the 5G, sophisticated beamforming and spatial multiplexing are performed by using a plurality of radiating elements, and a signal in a millimeter-wave band with higher frequencies (several tens of GHz) is also used in addition to a signal with a frequency in a 6 GHz band that has been used, aiming to achieve high communication speed and improve communication quality.

Radio waves with high frequencies, such as in the millimeter-wave band, have high directivity, and the intensity of a radio wave in a particular direction is high. In general, it is desirable that communication devices have high antenna characteristics in every direction (all spherical directions). However, as for radio waves having directivity described above, in some dispositions of radiating elements, sufficient antenna characteristics may be unable to be obtained in a partial region.

For example, in the antenna module disclosed in International Publication No. 2020/170722 (Patent Document 1) described above, radio waves are basically radiated in normal directions of two flat surfaces of the dielectric substrate. For that reason, antenna characteristics tend to decrease in an intermediate direction between two normal directions. Hence, in an antenna module in which radio waves having directivity are radiated, it is desired that high antenna characteristics be achieved over as wide a range as possible.

The present disclosure has been made to overcome such an issue and aims to extend a radio wave radiation range in an antenna module in which radiating elements are disposed on two substrates with different normal directions.

Solutions to Problems

As one example, an antenna module according to the present disclosure includes a first substrate and a second substrate disposed adjacent to each other, a first radiating element disposed on the first substrate, a second radiating element disposed on the second substrate, a hybrid coupler, and a feed circuit. The first substrate and the second substrate have different normal directions. The hybrid coupler includes a first input terminal and a second input terminal, and a first output terminal and a second output terminal. The feed circuit is connected to the first input terminal and the second input terminal and supplies a radio-frequency signal to the first radiating element and the second radiating element. The first radiating element and the second radiating element are capable of radiating a radio wave in a first frequency band. The first radiating element is connected to the first output terminal, and the second radiating element is connected to the second output terminal. A phase difference between radio-frequency signals to be supplied to the first input terminal and the second input terminal is adjusted to fall within a range of greater than −90° and less than 90°.

Advantageous Effects of Disclosure

In an antenna module according to the present disclosure, two output terminals of the hybrid coupler are connected to two radiating elements (the first radiating element, the second radiating element) disposed on two respective substrates with different normal directions from each other, and radio-frequency signals are supplied from the feed circuit to the two radiating elements via the hybrid coupler. In addition, radio-frequency signals are supplied to two input terminals of the hybrid coupler so that a phase difference $\alpha$ falls within a range of $-90° < \alpha < 90°$. Thus, the first radiating element and the second radiating element can be caused to apparently function as an array antenna and to radiate a radio wave in an intermediate direction between two normal directions of the two substrates as well as in the normal directions. Hence, in the antenna module in which the radiating elements are disposed on the two substrates with different normal directions, a radio wave radiation range can be extended.

DESCRIPTION OF EMBODIMENTS

Figure 1:
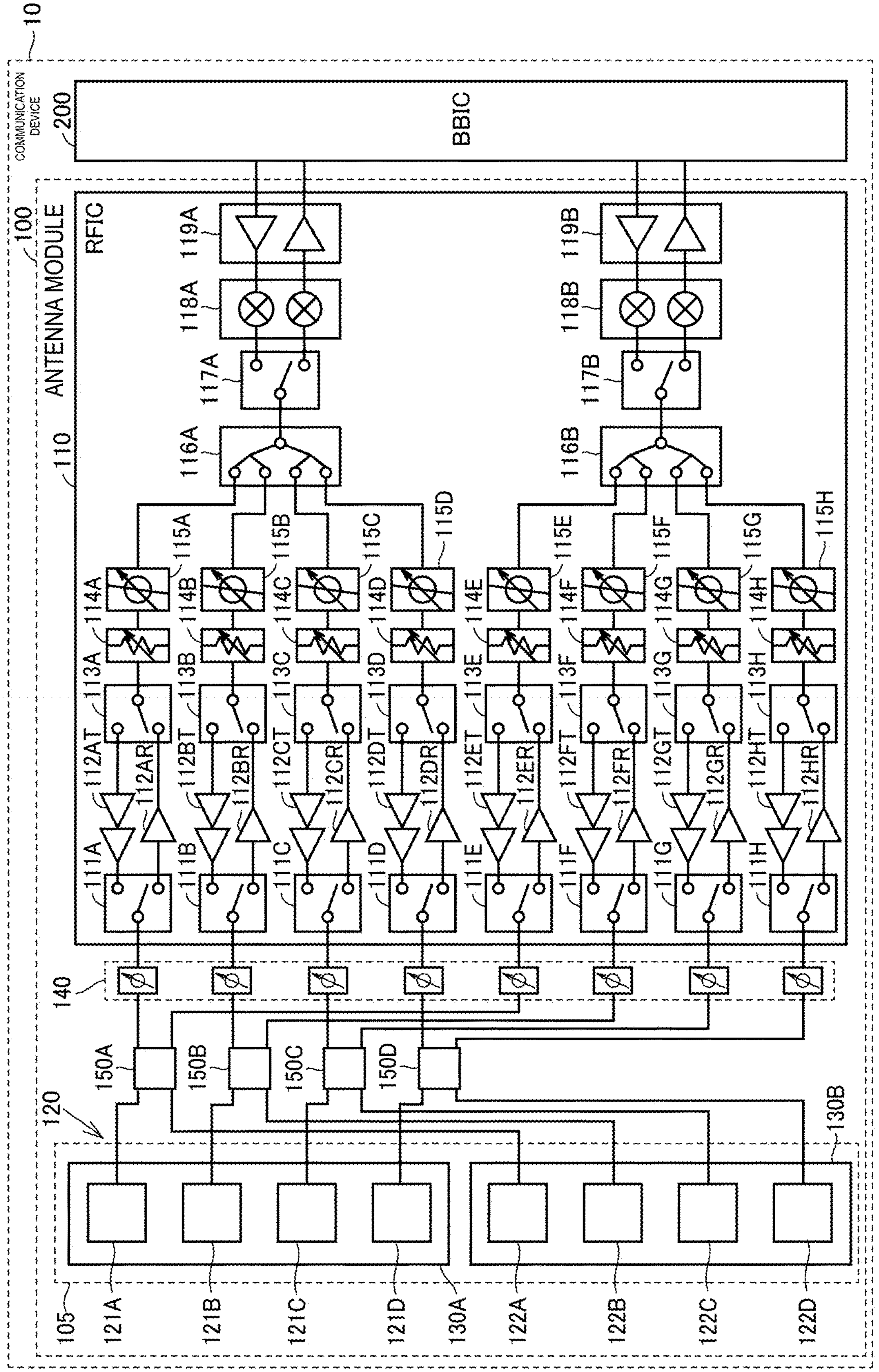
FIG. 1 is a block diagram of a communication device in which an antenna module according to Embodiment 1 is used.

Embodiments of the present disclosure will be described in detail below with reference to the drawings. Note that identical or corresponding elements or portions in the drawings are denoted by the same reference signs and a repeated description thereof is not given.

Embodiment 1

(Basic Configuration of Communication Device)

FIG. 1 is a block diagram of a communication device 10 in which an antenna module 100 according to this embodiment is used. The communication device 10 is, for example, a mobile terminal, such as a mobile phone, smartphone, or tablet, or a personal computer having a communication function. Although examples of a frequency band of radio waves (RF band) used in the antenna module 100 according to this embodiment include millimeter-wave bands with center frequencies of, for example, 28 GHZ, 39 GHZ, and 60 GHZ, radio waves in a frequency band other than the above-described bands can also be used.

Referring to FIG. 1, the communication device 10 includes the antenna module 100, and a BBIC 200 constituting a baseband signal processing circuit. The antenna module 100 includes an RFIC 110, which is an example of a feed circuit, an antenna device 120, a phase adjustment circuit 140, and hybrid couplers 150A to 150D. Note that, in the following description, the hybrid couplers 150A to 150D may be collectively referred to as "hybrid couplers 150" in some cases.

The communication device 10 up-converts a signal transmitted from the BBIC 200 to the antenna module 100 into a radio-frequency signal to radiate the radio-frequency signal from the antenna device 120, and also down-converts a radio-frequency signal received by the antenna device 120 to process the signal in the BBIC 200.

The antenna device 120 includes a dielectric substrate 105 including two substrates 130A and 130B. On each substrate of the dielectric substrate 105, at least one radiating element is disposed. More specifically, FIG. 1 illustrates an example of a configuration in which four radiating elements 121A to 121D are disposed on the substrate 130A and four radiating elements 122A to 122D are disposed on the substrate 130B. However, the number of radiating elements disposed on each substrate is not limited to this. Furthermore, FIG. 1 illustrates an example in which radiating elements are disposed in a one-dimensional array so as to be disposed in a line on each substrate of the dielectric substrate. However, radiating elements may be disposed in a two-dimensional array on each substrate. Alternatively, one radiating element may be disposed on each substrate.

Note that, in the following description, the radiating elements 121A to 121D may be collectively referred to as "radiating elements 121" and the radiating elements 122A to 122D may be collectively referred to as "radiating elements 122" in some cases. In Embodiment 1, the radiating elements 121 and the radiating elements 122 are substantially square flat-shaped microstrip antennas.

The RFIC 110 includes switches 111A to 111H, 113A to 113H, 117A, and 117B, power amplifiers 112AT to 112HT, low noise amplifiers 112AR to 112HR, attenuators 114A to 114H, phase shifters 115A to 115H, signal combiners/splitters 116A and 116B, mixers 118A and 118B, and amplifier circuits 119A and 119B. A circuit constituted by, among these, the switches 111A to 111D, 113A to 113D, and 117A, the power amplifiers 112AT to 112DT, the low noise amplifiers 112AR to 112DR, the attenuators 114A to 114D, the phase shifters 115A to 115D, the signal combiner/splitter 116A, the mixer 118A, and the amplifier circuit 119A is a circuit for radio-frequency signals radiated from the radiating elements 121 on the substrate 130A. Furthermore, a circuit constituted by the switches 111E to 111H, 113E to 113H, and 117B, the power amplifiers 112ET to 112HT, the low noise amplifiers 112ER to 112HR, the attenuators 114E to 114H, the phase shifters 115E to 115H, the signal combiner/splitter 116B, the mixer 118B, and the amplifier circuit 119B is a circuit for radio-frequency signals radiated from the radiating elements 122 on the substrate 130B.

When radio-frequency signals are transmitted, the switches 111A to 111H and 113A to 113H are switched to power amplifiers 112AT to 112HT sides, and the switches 117A and 117B are connected to transmission-side amplifiers of the amplifier circuits 119A and 119B. When radio-frequency signals are received, the switches 111A to 111H and 113A to 113H are switched to low noise amplifiers 112AR to 112HR sides, and the switches 117A and 117B are connected to reception-side amplifier of the amplifier circuits 119A and 119B.

Signals transmitted from the BBIC 200 are amplified by the amplifier circuits 119A and 119B and are up-converted by the mixers 118A and 118B. Transmission signals that are up-converted radio-frequency signals are split into four transmission signals by the signal combiners/splitters 116A and 116B. The split transmission signals are supplied to the corresponding hybrid couplers 150 via the phase adjustment circuit 140. The hybrid couplers 150 are so-called "90°-hybrid circuits" and include two input terminals and two output terminals as described later with reference to FIG. 4.

Transmission signals from the switch 111A and the switch 111E are supplied to two respective input terminals of the hybrid coupler 150A via the phase adjustment circuit 140. Two output terminals of the hybrid coupler 150A are connected to the respective radiating elements 121A and 122A. Transmission signals from the switch 111B and the switch 111F are supplied to two respective input terminals of the hybrid coupler 150B via the phase adjustment circuit 140. Two output terminals of the hybrid coupler 150B are connected to the respective radiating elements 121B and 122B.

Transmission signals from the switch 111C and the switch 111G are supplied to two respective input terminals of the hybrid coupler 150C via the phase adjustment circuit 140. Two output terminals of the hybrid coupler 150C are connected to the respective radiating elements 121C and 122C.

Transmission signals from the switch 111D and the switch 111H are supplied to two respective input terminals of the hybrid coupler 150D via the phase adjustment circuit 140. Two output terminals of the hybrid coupler 150D are connected to the respective radiating elements 121D and 122D.

The phase adjustment circuit 140 is provided in at least one of paths connected to the input terminals of each hybrid circuit. When the phase adjustment circuit 140 is adjusted, a phase difference between transmission signals to be input to each hybrid circuit is adjusted. Thus, the ratio between radio waves radiated from the radiating elements 121 and 122 is adjusted.

Note that the phase adjustment circuit 140 is not necessarily indispensable. A phase difference between transmission signals to be input to each hybrid circuit may be adjusted by adjusting the degrees of phase shift of the phase shifters 115A to 115H disposed in respective signal paths. Furthermore, when phase differences between transmission signals to be supplied to radiating elements on the individual substrates are adjusted by the phase shifters 115A to 115H, radio waves to be output from the individual substrates can be subjected to beamforming.

Reception signals that are radio-frequency signals received by the respective radiating elements 121 and 122 are conveyed to the RFIC 110, individually pass through four different signal paths, and are combined in the signal combiners/splitters 116A and 116B. The combined reception signals are down-converted by the mixers 118A and 118B, further amplified by the amplifier circuits 119A and 119B, and transmitted to the BBIC 200.

The RFIC 110 is formed as, for example, a single-chip integrated circuit component including the above-described circuit configuration. Alternatively, devices (switches, power amplifiers, low noise amplifiers, attenuators, and phase shifters) corresponding to the respective radiating elements 121A and 121B in the RFIC 110 may be formed as a single-chip integrated circuit component for the corresponding radiating element.

(Configuration of Antenna Module)

Figure 2:
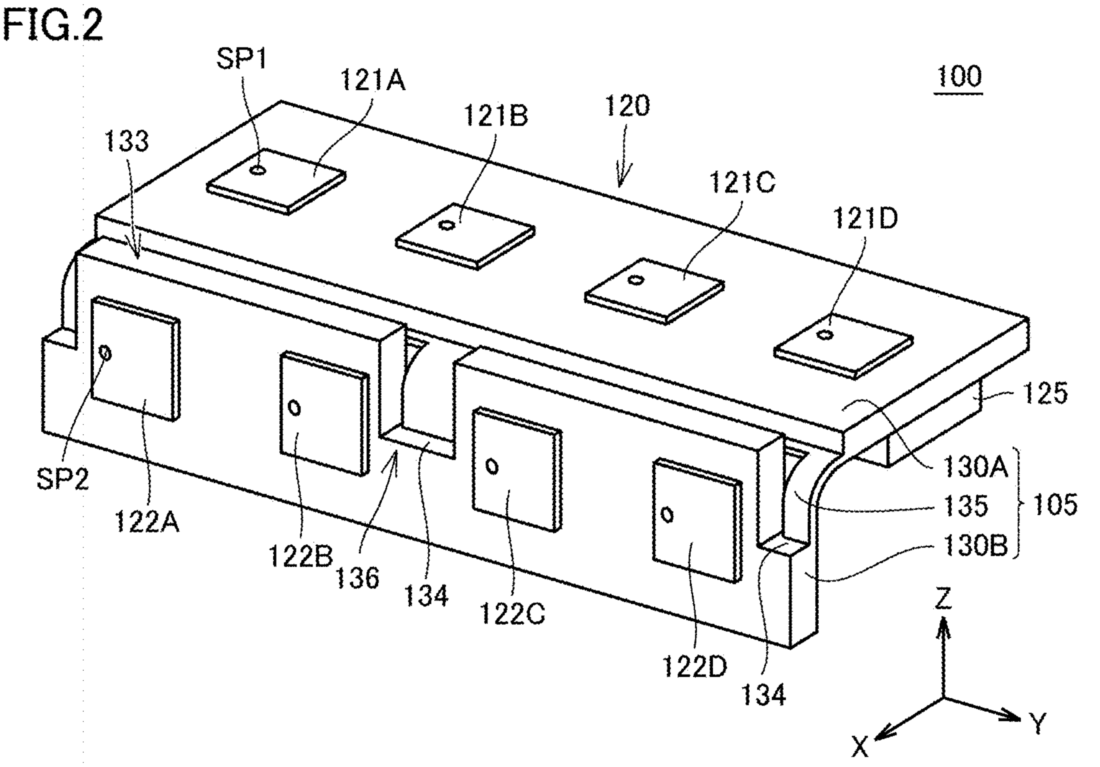
FIG. 2 is a perspective view of the antenna module according to Embodiment 1.

Next, a configuration of the antenna module 100 according to this embodiment will be described in detail with reference to FIGS. 2 and 3. FIG. 2 is a perspective view of the antenna module 100. Furthermore, FIG. 3 is a perspective side view of the antenna module 100 mounted on a mounting substrate 20.

Figure 3:
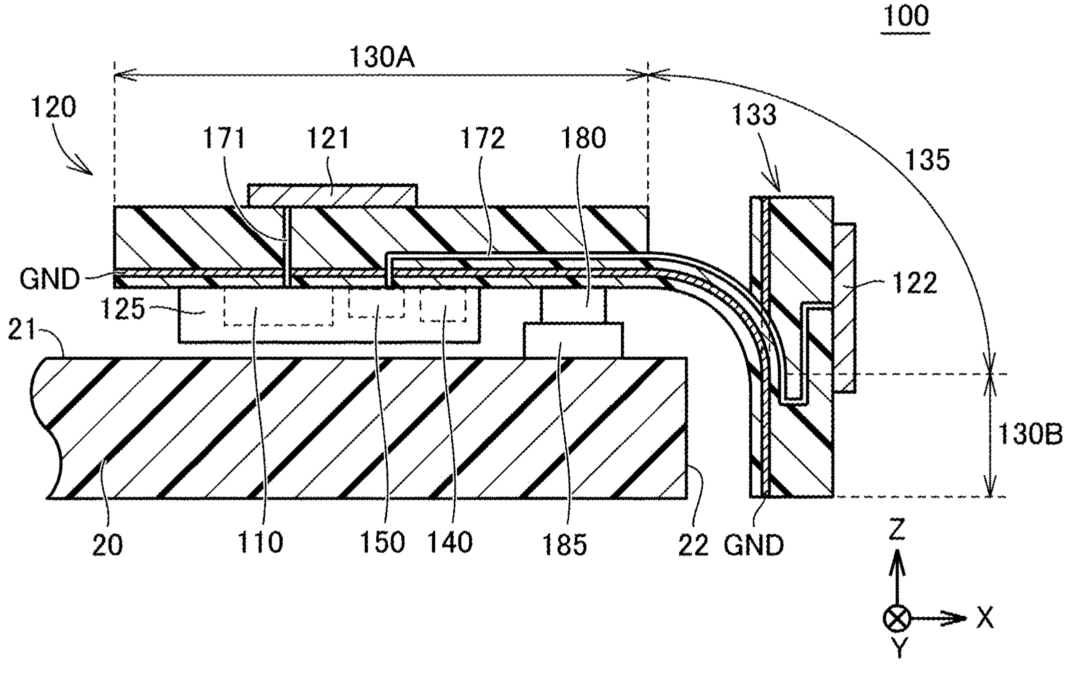
FIG. 3 is a perspective side view of the antenna module according to Embodiment 1.

Referring to FIGS. 2 and 3, the antenna module 100 includes a connector 180, feed lines 171 and 172, and a ground electrode GND in addition to the dielectric substrate 105, the radiating elements 121 and 122, the phase adjustment circuit 140, the hybrid couplers 150, and the RFIC 110. Note that, in the following description, a normal direction of the substrate 130A is a Z-axis direction, a normal direction of the substrate 130B is an X-axis direction, and a direction of an array of radiating elements on each substrate is a Y-axis direction. In each figure, a positive direction and a negative direction of a Z axis may be referred to as an upper surface side and a lower surface side, respectively, in some cases.

The dielectric substrate 105 is, for example, a Low Temperature Co-fired Ceramics (LTCC) multilayer substrate, a multilayer resin substrate formed by laminating a plurality of resin layers made of a resin, such as an epoxy or polyimide, a multilayer resin substrate formed by laminating a plurality of resin layers made of a Liquid Crystal Polymer (LCP) having a lower dielectric constant, a multilayer resin substrate formed by laminating a plurality of resin layers made of a fluororesin, or a ceramic multilayer substrate other than LTCC. Note that the dielectric substrate 105 does not necessarily have to have a multilayer structure and may be a single-layer substrate.

In the antenna device 120 of the antenna module 100, the dielectric substrate 105 is substantially L-shaped in cross section. The dielectric substrate 105 includes the flat-shaped substrate 130A with the normal direction being the Z-axis direction in FIGS. 2 and 3, the flat-shaped substrate 130B with the normal direction being the X-axis direction in FIGS. 2 and 3, and a bent portion 135 that connects the two substrates 130A and 130B. Note that, in Embodiment 1, the substrate 130A corresponds to a "first substrate" of the present disclosure and the substrate 130B corresponds to a "second substrate" of the present disclosure.

In the antenna module 100, four radiating elements are disposed in a line in the Y-axis direction on each of the two substrates 130A and 130B. In the following description, for ease of understanding, an example will be described in which the radiating elements 121 and 122 are disposed so as to be exposed on surfaces of the substrates 130A and 130B. However, the radiating elements 121 and 122 may be disposed inside the substrates 130A and 130B.

The substrate 130A is substantially rectangular in shape, and the four radiating elements 121A to 121D are disposed in a line in the Y-axis direction on the surface thereof. Furthermore, a System In Package (SiP) module 125 into which, for example, the RFIC 110, the phase adjustment circuit 140, the hybrid couplers 150, and a power module IC (not illustrated) are built, and the connector 180 are connected to a lower surface side (a surface facing the negative direction of the Z axis) of the substrate 130A. The substrate 130A is mounted on the mounting substrate 20 by connecting the connector 180 to a connector 185 disposed on a surface 21 of the mounting substrate 20. Note that the substrate 130A may be mounted on the mounting substrate 20 via solder connection.

The substrate 130B is connected to the bent portion 135 bent from the substrate 130A and is disposed such that an inner surface (a surface facing a negative direction of an X axis) thereof faces a side 22 of the mounting substrate 20. The substrate 130B has a configuration in which a plurality of notch portions 136 are formed in a substantially rectangular dielectric substrate, and the bent portion 135 is connected to the notch portions 136. In other words, in a portion where no notch portion 136 is formed in the substrate 130B, a protruding portion 133 protruding, from a boundary portion 134 to which the bent portion 135 and the substrate 130B are connected, along the substrate 130B in a direction toward the substrate 130A (that is, in the positive direction of the Z axis) is formed. A protruding end of the protruding portion 133 is positioned in the positive direction of the Z axis with respect to the surface on the lower surface side (the side facing the mounting substrate 20) of the substrate 130A.

On the protruding portion 133 of the substrate 130B in the antenna module 100, the radiating elements 122A to 122D are disposed corresponding to the radiating elements 121A to 121D disposed on the substrate 130A. Each of the radiating elements 122A to 122D on the substrate 130B is disposed such that at least part thereof overlaps the protruding portion 133. When viewed in plan from the normal direction of the substrate 130A, the radiating elements 122A to 122D are disposed so as to be arranged in the X-axis direction with respect to the radiating elements 121A to 121D, respectively.

The ground electrode GND is disposed on an inner layer inside surfaces of the substrate 130A and 130B and the bent portion 135, the surfaces facing the mounting substrate 20.

A radio-frequency signal is conveyed from the RFIC 110 in the SiP module 125 to the radiating elements 121 on the substrate 130A via the feed line 171. Furthermore, a radio-frequency signal is conveyed from the RFIC 110 to the radiating elements 122 on the substrate 130B via the feed line 172. The feed line 172 is connected from the RFIC 110, through the insides of dielectric substrates of the substrates 130A and 130B and the inside of a dielectric substrate of the bent portion 135, to the radiating elements 122 disposed on the substrate 130B.

Figure 4:
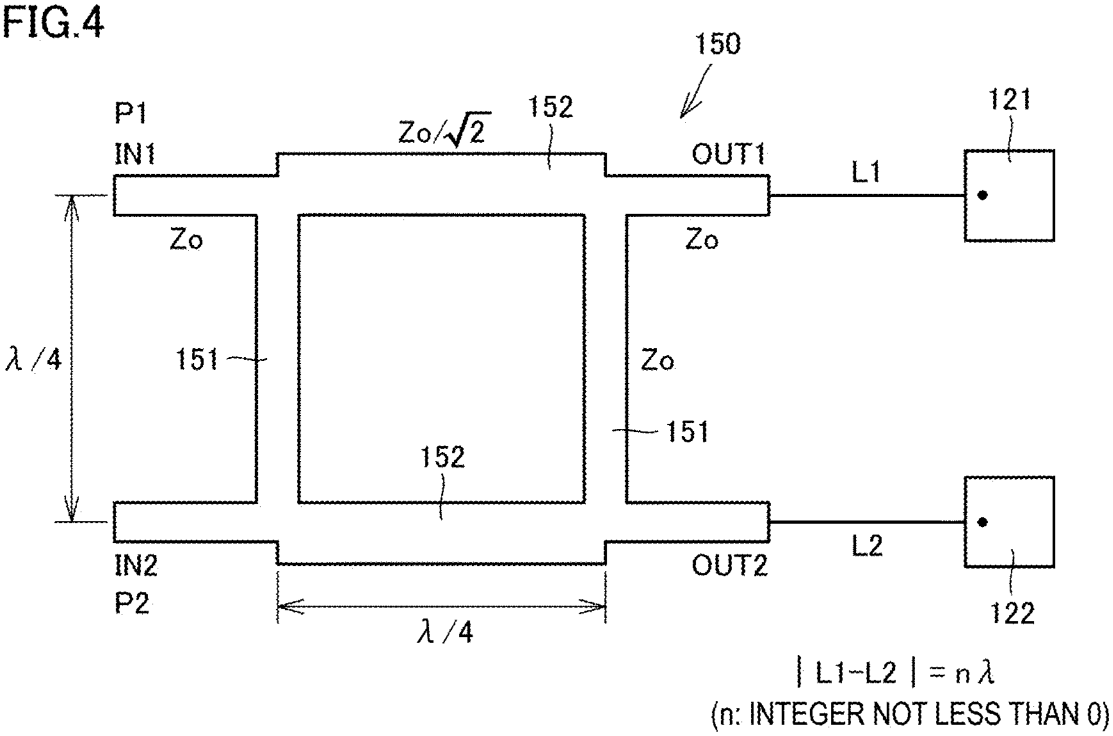
FIG. 4 is a diagram illustrating a hybrid coupler.

FIG. 4 is a diagram illustrating a hybrid coupler 150 in detail. The hybrid coupler 150 has a configuration in which two input terminals IN1 and IN2, two output terminals OUT1 and OUT2, two first lines 151 having a characteristic impedance Zo, and two second lines 152 having an impedance $Zo/\sqrt{2}$ are incorporated.

More specifically, one second line 152 is connected between the input terminal IN1 and the output terminal OUT1, and the other second line 152 is connected between the input terminal IN2 and the output terminal OUT2. Furthermore, the input terminal IN1 and the input terminal IN2 are connected by one first line 151, and the output terminal OUT1 and the output terminal OUT2 are connected by the other first line 151. When a wavelength of a radio wave radiated from each radiating element is $\lambda$, all of lengths of the first lines 151 and the second lines 152 are set to a length of $\lambda/4$.

A radiating element 121 is connected to the output terminal OUT1 via the feed line 171. Furthermore, a radiating element 122 is connected to the output terminal OUT2 via the feed line 172. A difference between a line length L1 of the feed line 171 and a line length L2 of the feed line 172 is set to be $n\lambda$ (n is an integer not less than zero). Thus, when radio-frequency signals with the same phase are output from the output terminals OUT1 and OUT2, radio waves with the same phase are radiated from the radiating elements 121 and 122.

In the hybrid coupler 150, when a radio-frequency signal with a phase difference of +90° with respect to the input terminal IN1 is supplied to the input terminal IN2, a radio-frequency signal with twice the power is output from the output terminal OUT1, but no radio-frequency signal is output from the output terminal OUT2. On the other hand, when a radio-frequency signal with a phase difference of −90° with respect to the input terminal IN1 is supplied to the input terminal IN2, a radio-frequency signal with twice the power is output from the output terminal OUT2, but no radio-frequency signal is output from the output terminal OUT1.

Furthermore, when a phase difference $\alpha$ of a radio-frequency signal to be supplied to the input terminal IN2 with respect to a radio-frequency signal to be supplied to the input terminal IN1 is adjusted to fall within a range of $-90°<\alpha<90°$, power is output from the output terminals OUT1 and OUT2 at a ratio corresponding to that phase difference. For example, when an adjustment is made to achieve a phase difference $\alpha=0°$, radio-frequency signals with the same power level are output from the output terminals OUT1 and OUT2. That is, the hybrid coupler 150 functions as a combiner and a splitter.

In the antenna module 100 according to Embodiment 1, one output terminal OUT1 of the two output terminals of the hybrid coupler 150 is connected to the radiating element 121 on the substrate 130A, and the other output terminal OUT2 is connected to the radiating element 122 on the substrate 130B. For that reason, when a phase difference $\alpha$ between radio-frequency signals to be input to the two input terminals IN1 and IN2 of the hybrid coupler 150 is adjusted to fall within the range of $-90°<\alpha<90°$, radio waves are radiated from both the radiating elements 121 and 122 at intensities with a ratio corresponding to the phase difference $\alpha$. When a polarization direction of an electrode radiated from the radiating element 121 and a polarization direction of a radio wave radiated from the radiating element 122 are set so as to coincide with each other, a radio wave can be radiated in a direction between the normal direction (the Z-axis direction) of the substrate 130A and the normal direction (the X-axis direction) of the substrate 130B.

Incidentally, if the hybrid coupler 150 and the RFIC 110 are disposed on different substrates, an increase in length of a transmission path between the hybrid coupler 150 and the RFIC 110 is likely to create differences in line lengths of two input transmission paths from the RFIC 110 to the hybrid coupler 150 and/or impedance matching states of those two paths. As a result, the amount of variation in a phase with respect to a frequency increases, frequency characteristics of a phase difference between two input terminals therefore become unstable, and it can be difficult to control a phase. For that reason, it is desirable that the hybrid coupler 150 be disposed on the same substrate as the RFIC 110. Although FIGS. 2 and 3 illustrate a configuration in which the SiP module 125 including the RFIC 110 and the hybrid coupler 150 is disposed on the substrate 130A, the SiP module 125 may be disposed on the substrate 130B.

(Distribution of Antenna Gain)

Figure 5:
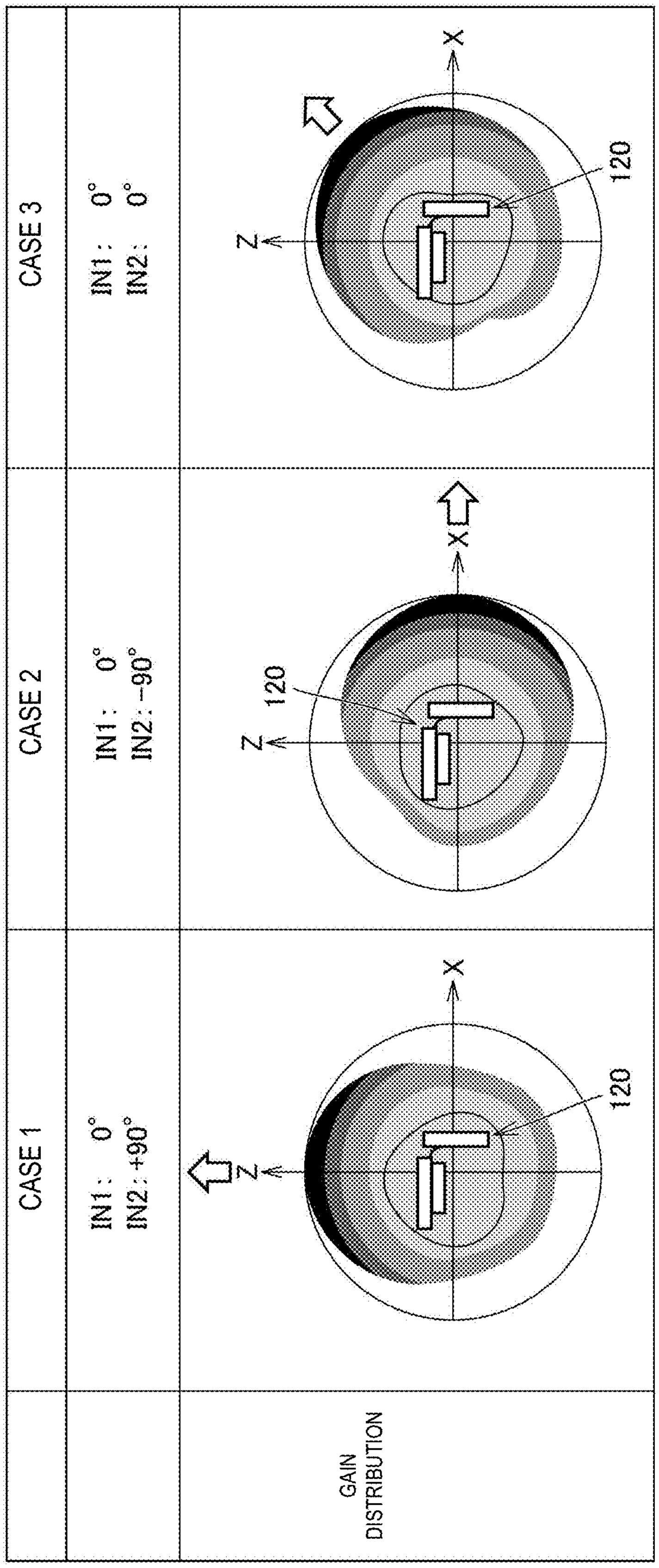
FIG. 5 is a diagram illustrating directivity exhibited when a phase difference between input signals to the hybrid coupler is changed in the antenna module according to Embodiment 1.

FIG. 5 is a diagram illustrating directivity exhibited when a phase difference between input signals to the hybrid coupler is changed in the antenna module according to Embodiment 1. In a left portion of FIG. 5, a case is illustrated where a radio-frequency signal with a phase difference of +90° with respect to a radio-frequency signal to be input to the input terminal IN1 is input to the input terminal IN2 (case 1). In a middle portion, a case is illustrated where a radio-frequency signal with a phase difference of −90° with respect to a radio-frequency signal to be input to the input terminal IN1 is input to the input terminal IN2 (case 2). Additionally, in a right portion, a case is illustrated where radio-frequency signals with the same phase are input to the input terminal IN1 and the input terminal IN2 (case 3). In FIG. 5, note that the density of a hatched pattern increases as antenna gain increases.

In the case 1, a radio-frequency signal is output only from the output terminal OUT1, and thus a radio wave is radiated from the radiating element 121 on the substrate 130A in the Z-axis direction. In the case 2, a radio-frequency signal is output only from the output terminal OUT2, and thus a radio wave is radiated from the radiating element 122 on the substrate 130B in the X-axis direction.

In the case 3, radio waves with the same power are radiated from the output terminal OUT1 and the output terminal OUT2, and thus a radio wave is radiated in an about 45° direction between the X axis and the Z axis. That is, in the case 3, the antenna module 100 operates as an array antenna including the radiating element 121 and radiating element 122.

Hence, when a radio-frequency signal with a phase difference of an angle between 0° and +90° with respect to a radio-frequency signal to be input to the input terminal IN1 is input to the input terminal IN2, a radio wave is radiated in directions of 45° to 90° from the X axis toward the Z axis. Furthermore, when a radio-frequency signal with a phase difference of an angle between −90° and 0° with respect to a radio-frequency signal to be input to the input terminal IN1 is input to the input terminal IN2, a radio wave is radiated in directions of 0° to 45° from the X axis toward the Z axis.

Next, referring to FIGS. 6 and 7, the distribution of antenna gain in the antenna module 100 according to Embodiment 1 will be described by comparison with the distribution of antenna gain in a comparative example.

Figure 6:
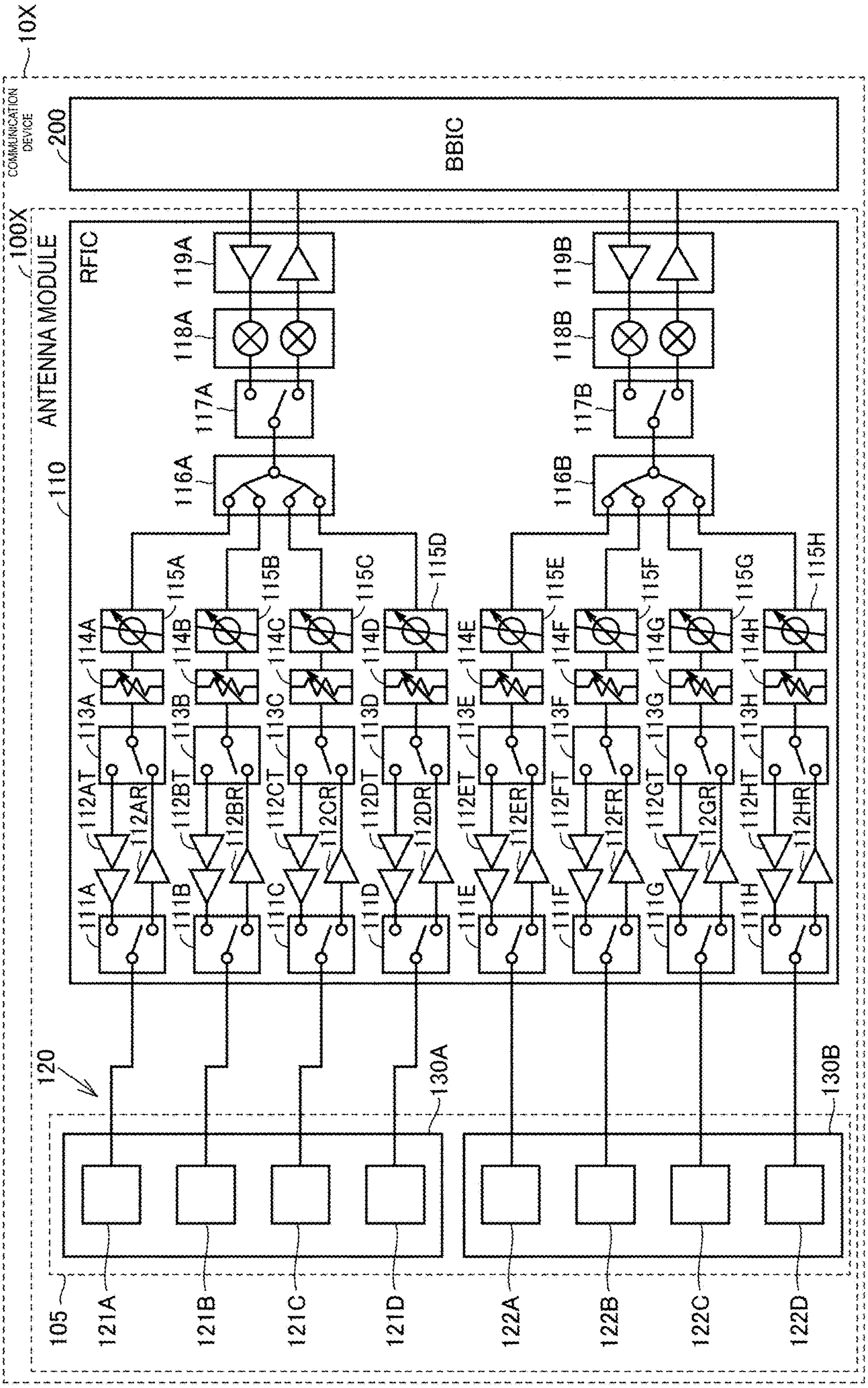
FIG. 6 is a block diagram of a communication device in which an antenna module according to a comparative example is used.

FIG. 6 is a block diagram of a communication device 10X in which an antenna module 100X according to a comparative example is used. In the antenna module 100X, the phase adjustment circuit 140 and the hybrid couplers 150 are not provided, and radio-frequency signals from the RFIC 110 are individually supplied to the respective radiating elements. Specifically, transmission signals from the switches 111A to 111D are supplied to the respective radiating elements 121A to 121D on the substrate 130A. Furthermore, transmission signals from the switches 111E to 111H are supplied to the respective radiating elements 122A to 122D on the substrate 130B.

Figure 7:
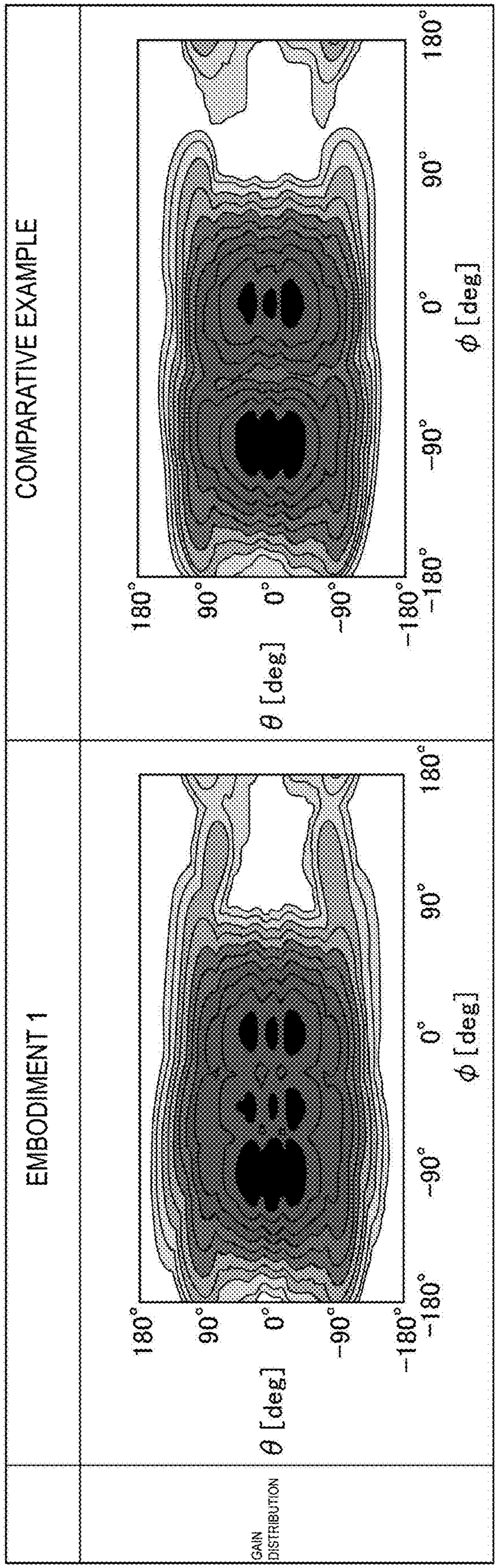
FIG. 7 is a diagram illustrating gain distributions in all spherical directions in the antenna modules according to Embodiment 1 and the comparative example.

FIG. 7 is a diagram illustrating gain distributions in all spherical directions in the antenna modules according to Embodiment 1 and the comparative example. In the gain distribution in FIG. 7, the horizontal axis represents an angle φ from the X-axis direction around a Y axis, and the vertical axis represents an angle θ from the Z-axis direction around the X axis. Furthermore, in FIG. 7, the density of a hatched pattern increases as gain increases. Note that, in the antenna module 100 according to Embodiment 1 in FIG. 7, radio-frequency signals with the same phase are supplied to the input terminals IN1 and IN2 of the hybrid coupler 150.

As illustrated in FIG. 7, in the comparative example, the gain reaches its peak at positions near φ=−90° and 0°, that is, in the normal directions of the substrates 130A and 130B, and the gain is low and is in a trough at a position near φ=−45°. On the other hand, in Embodiment 1, the gain reaches its peak at a position near φ=−45° as well as at positions near φ=−90° and 0°, and intensities of radio waves in three directions are high.

Thus, in the antenna module 100 according to Embodiment 1, when radio-frequency signals with a phase difference in the range of −90°<α<90° are input to the input terminals IN1 and IN2 of the hybrid coupler 150 to supply radio-frequency signals to the radiating elements 121 and 122, the radiating elements 121 and 122 can be caused to apparently function as an array antenna. Consequently, a radio wave can be radiated in a direction of an intermediate angle between the normal directions of the substrates 130A and 130B on which the radiating elements 121 and 122 are disposed as well as in the normal directions. Hence, in an antenna module in which radiating elements are disposed on two substrates with different normal directions, a radio wave radiation range can be extended.

Note that, in Embodiment 1, one of the "radiating elements 121" corresponds to a "first radiating element" of the present disclosure, and the corresponding radiating element of the "radiating elements 122" corresponds to a "second radiating element" of the present disclosure. Additionally, a radiating element adjacent to the "first radiating element" corresponds to a "third radiating element" of the present disclosure, and a radiating element adjacent to the "second radiating element" corresponds to a "fourth radiating element" of the present disclosure. Specifically, for example, the "radiating element 121A" and the "radiating element 122A" correspond to the "first radiating element" and the "second radiating element", and the "radiating element 121B" and the "radiating element 122B" correspond to the "third radiating element" and the "fourth radiating element". In this case, the "hybrid coupler 150A" and the "hybrid coupler 150B" respectively correspond to a "first hybrid coupler" and a "second hybrid coupler" in the present disclosure. In Embodiment 1, the "Y-axis direction" and the "X-axis direction" respectively correspond to a "first direction" and a "second direction" in the present disclosure.

In Embodiment 1, the "substrate 130A" and the "substrate 130B" respectively correspond to the "first substrate" and the "second substrate" in the present disclosure. In Embodiment 1, each of the "phase shifters 115A to 115H" corresponds to a "phase adjustment unit" in the present disclosure. In embodiment 1, the "phase adjustment circuit 140" corresponds to a "phase adjustment circuit" in the present disclosure.

Embodiment 2

In Embodiment 1, a so-called single-band and single-polarization type antenna module has been described in which a radio wave in a single frequency band and in a single polarization direction is radiated from each substrate.

In Embodiment 2, a dual-band and dual-polarization type antenna module will be described in which radio waves in two different frequency bands can be radiated from each substrate and in which polarized waves in two different directions can be radiated from each radiating element.

Figure 8:
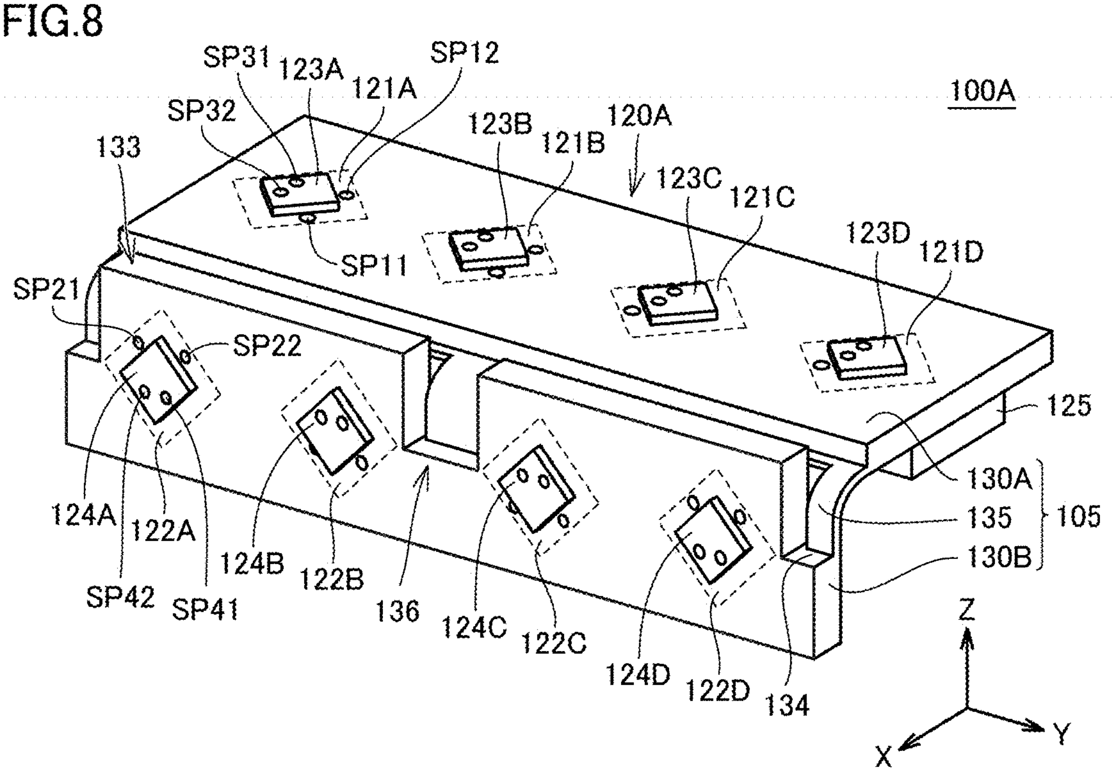
FIG. 8 is a perspective view of an antenna module according to Embodiment 2.

FIG. 8 is a perspective view of an antenna module 100A according to Embodiment 2. In an antenna device 120A of the antenna module 100A, two types of radiating elements are disposed on each of the substrate 130A and the substrate 130B. Specifically, on the substrate 130A, radiating elements 123A to 123D capable of radiating radio waves in a second frequency band different from a first frequency band are disposed in addition to the radiating elements 121A to 121D capable of radiating radio waves in the first frequency band. Furthermore, on the substrate 130B, radiating elements 124A to 124D capable of radiating radio waves in the second frequency band are disposed in addition to the radiating elements 122A to 122D capable of radiating radio waves in the first frequency band.

Note that, in the following description, in some cases, the radiating elements 121A to 121D may be collectively referred to as "radiating elements 121", the radiating elements 122A to 122D may be collectively referred to as "radiating elements 122", the radiating elements 123A to 123D may be collectively referred to as "radiating elements 123", and the radiating elements 124A to 124D may be collectively referred to as "radiating elements 124".

The radiating elements 123 and 124 are smaller than the radiating elements 121 and 122 in element size. That is, the frequency band (second frequency band) of radio waves radiated from the radiating elements 123 and 124 is higher than the frequency band (first frequency band) of radio waves radiated from the radiating elements 121 and 122. For example, the first frequency band is a 28 GHz band, and the second frequency band is a 39 GHz band. That is, the antenna module 100A is a dual-band type antenna module in which radio waves in two different frequency bands can be radiated.

The radiating elements 121 and the radiating elements 123 are substantially square flat-shaped and are disposed so as to overlap each other when viewed in plan from the normal direction of the substrate 130A. Similarly, the radiating elements 122 and the radiating elements 124 are substantially square flat-shaped and are disposed so as to overlap each other when viewed in plan from the normal direction of the substrate 130B.

Note that, although FIG. 8 illustrates an example of a configuration in which the high frequency-side radiating elements 123 and 124 are respectively disposed on the surfaces of the substrates 130A and 130B and the low frequency-side radiating elements 121 and 122 are respectively disposed inside the substrates 130A and 130B, the radiating elements 123 and 124 may also be respectively disposed inside the substrates 130A and 130B. Furthermore, in FIG. 8, each radiating element is disposed such that the sides of the radiating element are angled at 45° with respect to the sides of the substrates 130A and 130B. However, as in the antenna module 100 according to Embodiment 1 illustrated in FIG. 2, each radiating element may be disposed such that the sides of the radiating element are substantially parallel to the sides of the substrates 130A and 130B.

In each of the radiating elements 121 to 124, radio-frequency signals are supplied to two feed points. Thus, radio waves in two different polarization directions can be radiated from each of the radiating elements 121 to 124. That is, the antenna module 100A is a dual-polarization type antenna module in which radio waves in two different polarization directions can be radiated.

Radio-frequency signals are supplied to feed points of the radiating elements 121 and the corresponding radiating elements 122 via hybrid couplers. Similarly, radio-frequency signals are supplied to feed points of the radiating elements 123 and the corresponding radiating elements 124 via hybrid couplers. For example, as for the radiating element 121A and the radiating element 122A, radio-frequency signals are supplied from one hybrid coupler to feed points SP11 and SP21, and radio-frequency signals are supplied from one hybrid coupler to feed points SP12 and SP22. Similarly, as for the radiating element 123A and the radiating element 124A, radio-frequency signals are supplied from one hybrid coupler to feed points SP31 and SP41, and radio-frequency signals are supplied from one hybrid coupler to feed points SP32 and SP42. Note that feed points that are the same in terms of polarization direction are connected to one hybrid coupler.

Thus, in a dual-band and dual-polarization type antenna module like the antenna module 100A as well, when radio-frequency signals are supplied to corresponding radiating elements via a hybrid coupler and radio-frequency signals with a phase difference in the range of $-90° < \alpha < 90°$ are input to the hybrid coupler, a radio wave can be radiated in a direction of an intermediate angle between the normal directions of the substrates 130A and 130B as well as in the normal directions, and a radio wave radiation range can be extended.

Note that, in Embodiment 2, a "radiating element 123" and a "radiating element 124" respectively correspond to a "fifth radiating element" and a "sixth radiating element" in the present disclosure.

Embodiment 3

In Embodiments 1 and 2, a case has been described where each radiating element is substantially square in shape and the two substrates of the dielectric substrate are integrally formed. In Embodiment 3, a case will be described where each radiating element is substantially circular in shape and the substrates are made of individual substrates that are separate from each other.

Figure 9:
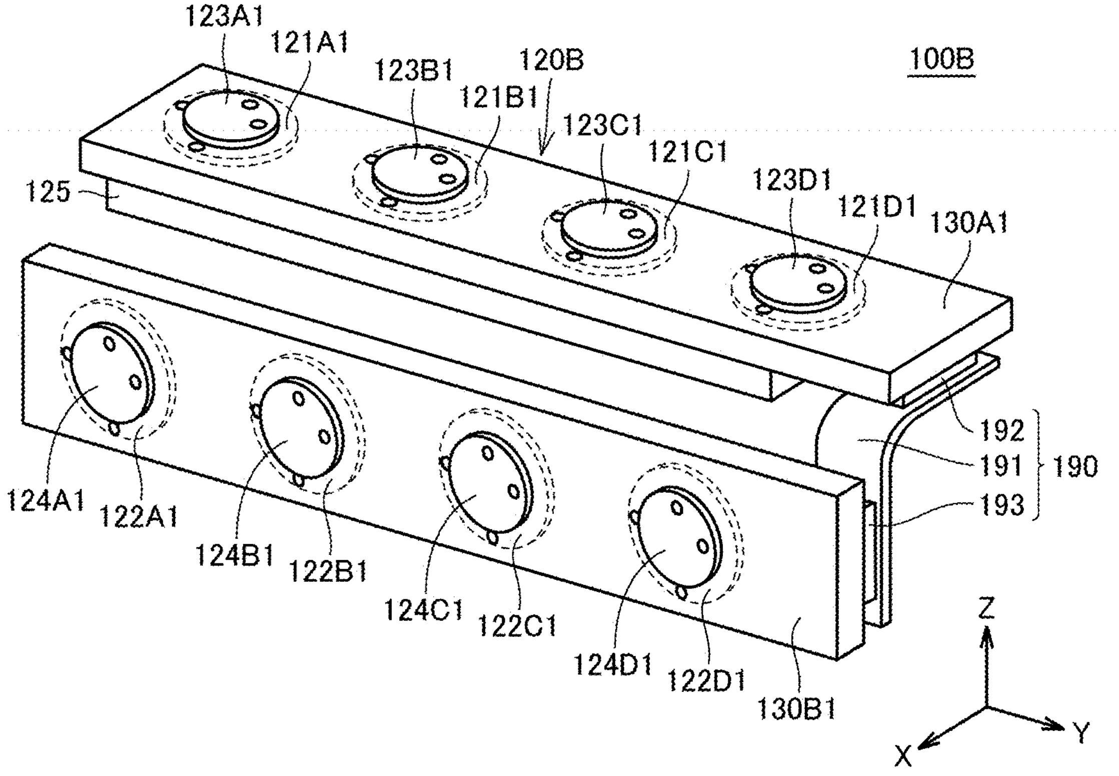
FIG. 9 is a perspective view of an antenna module according to Embodiment 3.

FIG. 9 is a perspective view of an antenna module 100B according to Embodiment 3. In an antenna device 120B of the antenna module 100B, a configuration is provided in which two separate flat-shaped substrates 130A1 and 130B1 are connected by a connection member 190. The connection member 190 includes a strip-shaped flexible substrate 191 that is bendable, and connectors 192 and 193 disposed on both ends of the flexible substrate 191. The connector 192 is connected to a connector, which is not illustrated, disposed on the substrate 130A1. Similarly, the connector 193 is connected to a connector, which is not illustrated, disposed on the substrate 130B1.

On the substrate 130A1, radiating elements 121A1 to 121D1 and radiating elements 123A1 to 123D1 that are substantially circular flat-shaped are disposed so as to be arranged in the Y-axis direction. Furthermore, on the substrate 130B1, radiating elements 122A1 to 122D1 and radiating elements 124A1 to 124D1 that are substantially circular flat-shaped are disposed so as to be arranged in the Y-axis direction. The radiating elements 121A1 to 121D1 and the radiating elements 122A1 to 122D1 are larger than the radiating elements 123A1 to 123D1 and the radiating elements 124A1 to 124D1 in diameter. That is, the frequency band of radio waves radiated from the radiating elements 121A1 to 121D1 and the radiating elements 122A1 to 122D1 is lower than the frequency band of radio waves radiated from the radiating elements 123A1 to 123D1 and the radiating elements 124A1 to 124D1.

Furthermore, in each radiating element of the radiating elements 121A1 to 121D1 and the radiating elements 123A1 to 123D1, there are disposed two feed points for radiating a radio wave in the X-axis direction as a polarization direction and a radio wave in the Y-axis direction as a polarization direction. Similarly, in each radiating element of the radiating elements 122A1 to 122D1 and the radiating elements 124A1 to 124D1, there are disposed two feed points for radiating a radio wave in the Y-axis direction as a polarization direction and a radio wave in the Z-axis direction as a polarization direction.

Additionally, of the radiating elements 121A1 to 121D1 and the radiating elements 122A1 to 122D1, in corresponding radiating elements, radio-frequency signals are supplied from one hybrid coupler to respective feed points for a Y-axis polarization direction, and radio-frequency signals are supplied from one hybrid coupler to a feed point for an X-axis polarization direction and a feed point for a Z-axis polarization direction. Similarly, of the radiating elements 123A1 to 123D1 and the radiating elements 124A1 to 124D1, in corresponding radiating elements, radio-frequency signals are supplied from one hybrid coupler to respective feed points for the Y-axis polarization direction, and radio-frequency signals are supplied from one hybrid coupler to a feed point for the X-axis polarization direction and a feed point for the Z-axis polarization direction.

As in the antenna module 100B, even in a case where individual substrates are connected by a connection member and even in a case where radiating elements are circular in shape, when radio-frequency signals are supplied to two corresponding radiating elements disposed on the different substrates via a hybrid coupler, a radio wave radiation range can be extended.

The embodiments disclosed herein are to be considered to be illustrative and not restrictive in any respect. The scope of the present invention is defined not by the description of the embodiments described above, but by the claims, and is intended to include all changes made within the meaning and scope equivalent to the claims.

REFERENCE SIGNS LIST

10, 10X communication device
20 mounting substrate

21 surface
22 side
100, 100A, 100B, 100X antenna module
105 dielectric substrate
110 RFIC
111A to 111H, 113A to 113H, 117A, 117B switch
112AR to 112HR low noise amplifier
112AT to 112HT power amplifier
114A to 114H attenuator
115A to 115H phase shifter
116A, 116B signal combiner/splitter
118A, 118B mixer
119A, 119B amplifier circuit
120, 120A, 120B antenna device
121, 121A to 121D, 121A1 to 121D1, 122, 122A to 122D, 122A1 to 122D1, 123, 123A to 123D, 123A1 to 123A1, 124, 124A to 124D, 124A1 to 124D1 radiating element
125 SiP module
130A, 130A1, 130B, 130B1 substrate
133 protruding portion
134 boundary portion
135 bent portion
136 notch portion
140 phase adjustment circuit
150, 150A to 150D hybrid coupler
151, 152 line
171, 172 feed line
180, 185, 192, 193 connector
190 connection member
191 flexible substrate
200 BBIC
GND ground electrode
IN1, IN2 input terminal
OUT1, OUT2 output terminal
SP11, SP12, SP21, SP22, SP31, SP32, SP41, SP42 feed point

The invention claimed is:

1. An antenna module comprising:
a first substrate and a second substrate disposed adjacent to each other and having different normal directions;
a first radiating element disposed on the first substrate;
a second radiating element disposed on the second substrate;
a first hybrid coupler including a first input terminal and a second input terminal, and a first output terminal and a second output terminal; and
a feed circuit connected to the first input terminal and the second input terminal and configured to supply a radio-frequency signal to the first radiating element and the second radiating element, wherein
the first radiating element and the second radiating element are configured to be capable of radiating a radio wave in a first frequency band,
the first radiating element is connected to the first output terminal,
the second radiating element is connected to the second output terminal, and
a phase difference between radio-frequency signals to be supplied to the first input terminal and the second input terminal is adjusted to fall within a range of greater than −90° and less than 90°.

2. The antenna module according to claim 1, further comprising a conductive connection portion connecting the first substrate and the second substrate.

3. The antenna module according to claim 1, wherein main surfaces of the first substrate and the second substrate are disposed in separate planes.

4. The antenna module according to claim 1, wherein, under a condition a wavelength of radio waves radiated from the first radiating element and the second radiating element is λ and n is an integer not less than zero, a difference between a line length from the first output terminal to the first radiating element and a line length from the second output terminal to the second radiating element is nλ.

5. The antenna module according to claim 1, wherein the feed circuit includes phase adjustment circuit components configured to adjust respective phases of radio-frequency signals to be supplied to the first input terminal and the second input terminal.

6. The antenna module according to claim 1, further comprising a phase adjustment circuit disposed at least between the feed circuit and the first input terminal or between the feed circuit and the second input terminal.

7. The antenna module according to claim 1, wherein the antenna module is configured to accommodate a phase difference between radio-frequency signals to be supplied to the first input terminal and the second input terminal that are adjusted to −90° or 90°.

8. The antenna module according to claim 1, wherein each of the first radiating element and the second radiating element is configured to be capable of radiating a radio wave in two different polarization directions.

9. The antenna module according to claim 1, wherein a polarization direction of a radio wave radiated from the first radiating element and a polarization direction of a radio wave radiated from the second radiating element coincide with each other.

10. The antenna module according to claim 1, wherein the feed circuit and the first hybrid coupler are disposed on a same substrate selected between the first substrate and the second substrate.

11. The antenna module according to claim 1, further comprising:
a third radiating element disposed adjacent to the first radiating element on the first substrate;
a fourth radiating element disposed adjacent to the second radiating element on the second substrate; and
a second hybrid coupler including a third input terminal and a fourth input terminal, and a third output terminal and a fourth output terminal, wherein
the third radiating element and the fourth radiating element are configured to be capable of radiating a radio wave in the first frequency band,
the third radiating element is connected to the third output terminal,
the fourth radiating element is connected to the fourth output terminal,
the feed circuit is configured to be capable of supplying a radio-frequency signal to the third input terminal and the fourth input terminal, and
a phase difference between radio-frequency signals to be supplied to the third input terminal and the fourth input terminal is identical to a phase difference between radio-frequency signals to be supplied to the first input terminal and the second input terminal.

12. The antenna module according to claim 11, wherein the feed circuit is configured to be capable of adjusting a radiation direction of a radio wave by imparting a phase difference between radio-frequency signals to be supplied to the third radiating element and the fourth radiating element with respect to radio-frequency signals to be supplied to the first radiating element and the second radiating element.

13. The antenna module according to claim 11, wherein on the first substrate, the first radiating element and the third radiating element are disposed so as to be arranged in a first direction, on the second substrate, the second radiating element and the fourth radiating element are disposed so as to be arranged in the first direction, the first radiating element and the second radiating element are disposed so as to be arranged in a second direction different from the first direction, and the third radiating element and the fourth radiating element are disposed so as to be arranged in the second direction.

14. The antenna module according to claim 13, wherein the first direction and the second direction are orthogonal to each other.

15. The antenna module according to claim 1, further comprising:

a fifth radiating element disposed on the first substrate;

a sixth radiating element disposed on the second substrate; and a third hybrid coupler including a fifth input terminal and a sixth input terminal, and a fifth output terminal and a sixth output terminal, wherein the fifth radiating element and the sixth radiating element are configured to be capable of radiating a radio-frequency signal in a second frequency band different from the first frequency band, the feed circuit is configured to be capable of supplying a radio-frequency signal to the fifth input terminal and the sixth input terminal, the fifth radiating element is connected to the fifth output terminal, the sixth radiating element is connected to the sixth output terminal, and a phase difference between radio-frequency signals to be supplied to the fifth input terminal and the sixth input terminal is adjusted to fall within a range of greater than −90° and less than 90°.

16. A communication device comprising:

a baseband integrated circuit that performs baseband processing on signals exchanged with an antenna module; and the antenna module, the antenna module including a first substrate and a second substrate disposed adjacent to each other and having different normal directions, a first radiating element disposed on the first substrate, a second radiating element disposed on the second substrate, a first hybrid coupler including a first input terminal and a second input terminal, and a first output terminal and a second output terminal, and a feed circuit connected to the first input terminal and the second input terminal and configured to supply a radio-frequency signal to the first radiating element and the second radiating element, wherein the first radiating element and the second radiating element are configured to be capable of radiating a radio wave in a first frequency band, the first radiating element is connected to the first output terminal, the second radiating element is connected to the second output terminal, and a phase difference between radio-frequency signals to be supplied to the first input terminal and the second input terminal is adjusted to fall within a range of greater than −90° and less than 90°.

17. The communication device of claim 16, wherein the antenna module further comprising a conductive connection portion connecting the first substrate and the second substrate.

18. The communication device of claim 16, wherein main surfaces of the first substrate and the second substrate are disposed in separate planes.

19. The communication device of claim 16, wherein, under a condition a wavelength of radio waves radiated from the first radiating element and the second radiating element is λ and n is an integer not less than zero, a difference between a line length from the first output terminal to the first radiating element and a line length from the second output terminal to the second radiating element is nλ.

20. The communication device of claim 16, wherein the feed circuit includes phase adjustment circuit components configured to adjust respective phases of radio-frequency signals to be supplied to the first input terminal and the second input terminal.

* * * * *